United States Patent [19]

Crouse

[11] 4,383,825

[45] May 17, 1983

[54] HOLDING DEVICE FOR THE FIRING OF CERAMICS AND THE LIKE

[76] Inventor: Dennis L. Crouse, 8961 E. 10-Mile Rd., Manton, Mich. 49663

[21] Appl. No.: 303,176

[22] Filed: Sep. 17, 1981

[51] Int. Cl.³ .......................... F27D 5/00; B25B 7/00; B25B 7/14; B23Q 3/02

[52] U.S. Cl. .................................. 432/258; 81/5.1 R; 81/328; 269/96; 269/238

[58] Field of Search .............. 432/258; 81/5.1 R, 328, 81/340; 269/96, 238, 900

[56] References Cited

U.S. PATENT DOCUMENTS

| | | | |
|---|---|---|---|
| 1,152,239 | 8/1915 | Thom | 269/238 |
| 2,447,562 | 8/1948 | Burri | 269/238 |
| 3,287,042 | 11/1966 | Baer | 269/238 |
| 4,184,840 | 1/1980 | Gamberg et al. | 432/258 |

FOREIGN PATENT DOCUMENTS

| | | | |
|---|---|---|---|
| 1010414 | 6/1952 | France | 432/258 |
| 2274401 | 2/1976 | France | 81/328 |

*Primary Examiner*—John J. Camby
*Attorney, Agent, or Firm*—Lon H. Romanski

[57] ABSTRACT

A holding device for supporting a dental workpiece and the like is shown as having a main body attachable as to a cooperating base or sagger tray; the main body carries a fixed extending first arm; a lever is pivotally fixed to the main body and carries a second arm which when pivoted moves toward or away the first arm; a disengageable latching arrangement is provided whereby the lever may be effectively latched in any selected position as to thereby cause the first and second arms to hold the dental workpiece in a selected position.

18 Claims, 12 Drawing Figures

HOLDING DEVICE FOR THE FIRING OF CERAMICS AND THE LIKE

FIELD OF THE INVENTION

This invention relates generally to the field of supporting or holding structures and more particularly to such holding or supporting structures for engaging and holding, in selected attitudes, dental bridgework, dental crowns and other dental restorations which must be baked or fired during the production thereof.

BACKGROUND OF THE INVENTION

Heretofore it has been accepted practice in the prior art to employ a base-like member, often referred to as a sagger tray, which was formed to provide a plurality of generally vertically extending holes formed therein, and to place, within such holes one or more support pins or dowels. Usually such pins or dowels extended a substantial distance above the sagger tray and often terminated in generally pointed or narrowed ends. When a dental restoration as, for example, a porcelain covered crown was to be fired, the crown would be placed, in a generally inverted cup position, atop the support pin or dowel and then fired. Generally, this is still accepted practice.

However, often the dental restorations are such as to result in configurations which present great difficulty, if not an impossibility, in finding a position thereof atop such a support pin or dowel which will result in a stable balance of the restoration during placement of the restoration into the kiln, during the actual firing and during the process of removing the restoration from the kiln. Often, in the prior art, a delicately balanced dental restoration would, as it became heated, shift in its position even though slightly but sufficiently to become unbalanced and consequently fall as against another closely spaced restoration causing both to become damaged and requiring the reprocessing of both.

Accordingly, the invention as herein disclosed is primarily directed to the solution of such and other attendant and related problems of the prior art.

SUMMARY OF THE INVENTION

According to the invention, a holding device for supporting a dental workpiece and the like comprises body means for attachment to associated base means, lever means pivotally carried by said body means, said lever means comprising a first arm and a second arm, said body means comprising a third arm, said first arm being manually pivotally rotatable as to thereby pivotally swing said second arm towards and away from said third arm, said second and third arms being effective to cooperatively engage said dental workpiece as to maintain said dental workpiece in a selected attitude.

Other general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 3:
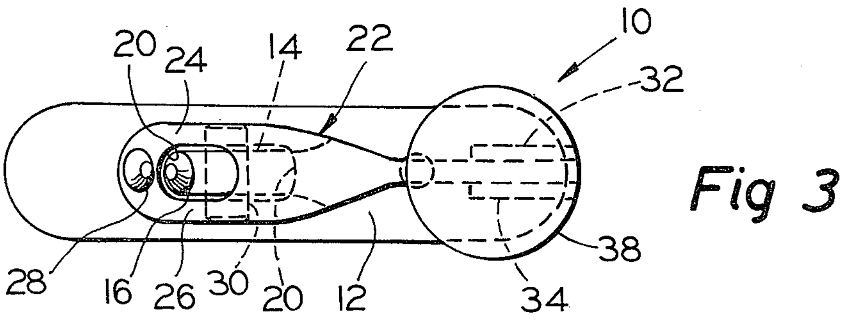
FIG. 3 is a top plan view taken generally on the plane of line 3—3 of FIG. 1 and looking in the direction of the arrows.
Figure 1:
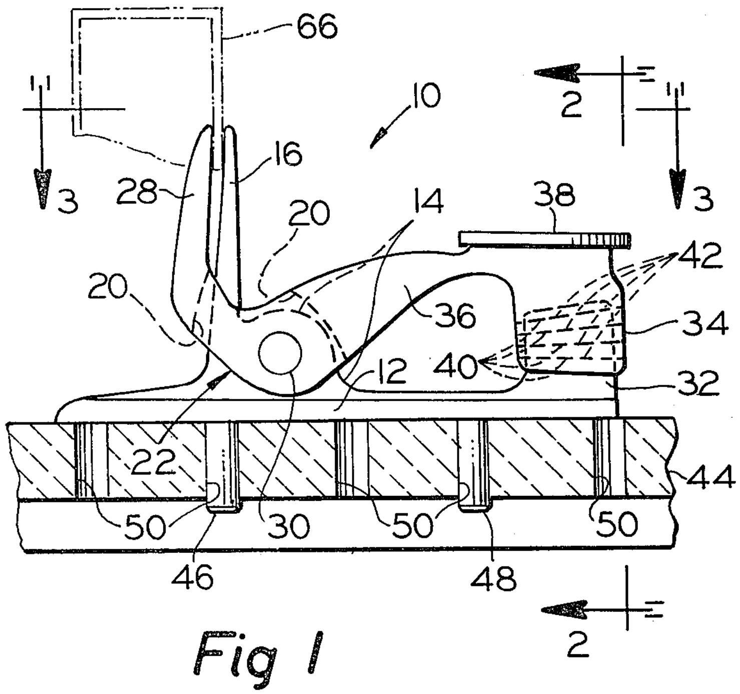
FIG. 1 is a side elevational view of a holding device, embodying teachings of the invention, shown supported in an associated fragmentarily illustrated, and in cross-section, sagger tray.
Figure 2:
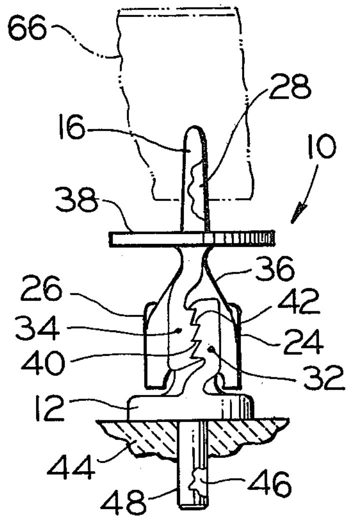
FIG. 2 is an end elevational view taken generally on the plane of line 2—2 of FIG. 1 and looking in the direction of the arrows.

Referring now in greater detail to the drawings, FIGS. 1, 2 and 3 illustrate the holding apparatus 10 of the invention as comprising a generally lower disposed base or main body 12 with a generally upstanding portion 14 and an integrally formed generally vertically upwardly extending arm or clamping member 16. A lever member 22 has an opening or clearance passage means 20 formed therethrough as to define generally opposed and spaced lever body portions 24 and 26. The opening 20 accommodates the pivotal reception therein of the upstanding body portion 14 as well as the passage therethrough of the upwardly extending arm 16. The generally left end (as viewed in either FIGS. 1 or 3) of the lever member 22 has an integrally formed arm 28 which also extends generally vertically upwardly. As illustrated in both FIGS. 1 and 3, a pivot pin 30 is received as through lever body portions 24 and 26 and upstanding body portion 14 as to thereby enable pivotal rotation of lever member 22 relative to main body 12. As lever member 22 undergoes pivotal rotation, arm 28, as best seen in FIG. 3, moves in a path which passes generally through the vertical arm 16 so that upon sufficient clockwise (as viewed in FIG. 1) rotation of lever member 22, arm 28 is brought into at least proximate juxtaposition with arm 16.

In the preferred embodiment of the invention, coacting latching or detent means are provided in order to assure that the lever member 22 will remain in a selected position. In the preferred embodiment, such latching or detent means comprises coacting latching or detent portions 32 and 34 with detent portion 32 being carried as by the right end (as viewed in FIG. 1) of body or base 12 and detent portion 34 being carried as by arm portion 36 of lever member 22.

As seen in each of FIGS. 1, 2 and 3, arm 36 is provided with a generally laterally extending thumb actuator plate 38 which may be integrally formed with the downwardly depending detent or latching body portion 34 which generally coacts with the upwardly extending detent or latching body portion 32. As best seen in both FIGS. 1 and 2, detent body portion 32 is provided with a plurality of serrations or teeth 40 which coact with a plurality of serrations or teeth 42 carried by detent body portion 34. As best seen in FIG. 1, the teeth or serrations 40 and 42 are preferably formed as to be generally radii of the center or axis of pivot means 30.

In the preferred embodiment, means are provided whereby the entire structure 10 can be readily detachably mounted or secured to an associated support or sagger tray 44. In the preferred embodiment a plurality of pegs or pins 46 and 48 are integrally formed with the body or base 12 as to depend downwardly therefrom. Such pins 46 and 48 are generally closely received with respective passages 50 formed in the sagger or support means 44 thereby permitting the base or body 12 to rest atop thereof.

Figure 4:
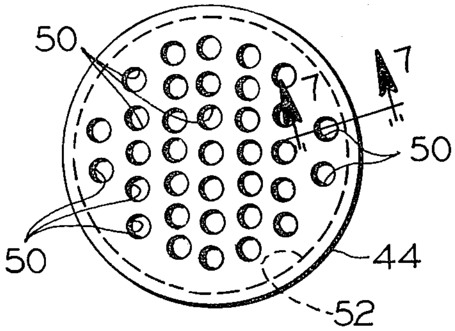
FIGS. 4, 5 and 6 are top plan views, in relatively reduced scale, of some of the sagger trays employable in combination with holding devices of the invention.
Figure 5:
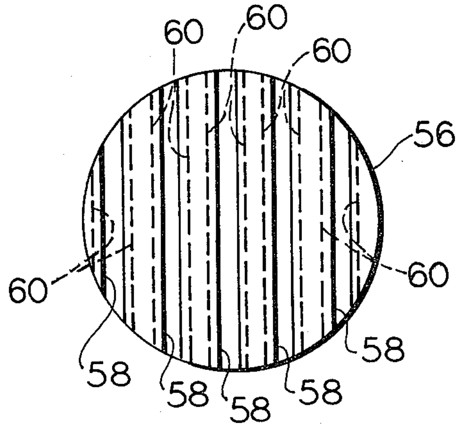
Figure 6:
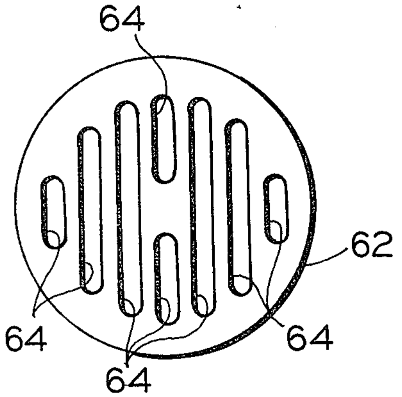
Figure 7:
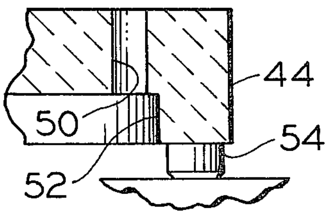
FIG. 7 is a fragmentary cross-sectional view, in relatively enlarged scale, taken generally on the plane of line 7—7 of FIG. 4 and looking in the direction of the arrows.

Although the practice of the invention is not so limited, FIGS. 4, 5 and 6 illustrate various forms of support or sagger tray means employable in the practice of the invention. In fact, FIG. 4 may be considered as being a top plan view, in reduced scale, of the sagger tray or support means 44 of FIGS. 1 and 2. As depicted, the support or tray 44 is provided with a plurality of vertically extending passages or holes 50 and, as depicted in enlarged scale in FIG. 7, may be of a generally inverted cup-like shape having a generally annular side wall portion 52 which, in turn, may be supported as by a plurality of leg-like members one of which is typically illustrated at 54.

The sagger tray 56 of FIG. 5 is depicted as having a plurality of slots 58 instead of the holes or passages 50 of FIG. 4. Such slots 58, of course, are effective for slidably receiving the pins or members 48 of the clamping or holding device 10. In other respects, the sagger tray 56 may be of a configuration as that of tray or support 44. Further, as also depicted in FIG. 5, the slots 58 may be opened into respective enlarged slot-like openings 60 as to thereby define what is commonly referred to as "T" slots.

The sagger tray 62 of FIG. 6 is depicted as having a plurality of slots or elongated recesses 64 instead of the holes or passages 50 of FIG. 4. Such slots or recesses 64 are, of course, effective for slidably receiving the pins or anchor means 48 of the clamping or holding device 10. In other respects, the sagger tray 62 may be of a configuration as that of tray or support 44.

OPERATION OF INVENTION

The holding or clamping device 10 is preferably formed of a non-precious metal which will withstand the high temperatures encountered within the associated kiln during firing of the ceramic or porcelain material of, for example, a dental restoration or appliance. In practice, the arm 36 is made sufficiently long and sufficiently thin as to permit the swinging end thereof to be slightly resiliently deflected, by application of a relatively slight force somewhat downwardly against and laterally of the pressure or actuator plate portion 38 thereby, as viewed in FIG. 2, causing the detent body portion 34 and teeth 42 to move generally to the left and out of latching engagement with juxtaposed cooperating teeth 40. When the swinging or swingable end of arm 36 is thusly latchingly disengaged, the entire lever member 22 may be rotated in an opening direction (counter-clockwise as viewed in FIG. 1) thereby causing arm 28 to generally swing away from stationary arm or clamping member 16.

When thusly opened, an associated dental restoration or appliance 66 may have a portion thereof placed or inserted generally between clamping arms 16 and 28 and the lever 22 is then rotated clockwise (as viewed in FIG. 1). Such clockwise rotation continues until the arms 16 and 28 engage and firmly contain the restoration or workpiece 66 therebetween and latching or detent teeth or serrations 40 and 42 are cooperatively engaged with each other.

The foregoing may be performed prior to or after the placement of the holding device 10 into and onto the support means or sagger tray 44.

Depending upon the thickness of the portion of the workpiece 66 being thusly clamped between arms 28 and 16, cooperative latching engagement between one or more teeth or serrations of each of the detent portions 32 and 34 will be experienced. That is, if a relatively thick workpiece 66 is being held or clamped, possibly only the lowermost (as viewed in FIG. 2) tooth or serration 42 of detent portion 34 will operatively engage the upper-most tooth or serration 40 of detent portion 32, while, if the workpiece 66 is relatively thin, all of the teeth or serrations 42 will operatively engage all of the teeth or serrations 40 as generally depicted in FIGS. 1 and 2. As stated, in the preferred embodiment the serrations or detents 40 and 42 are as radii from the axis of pivot 30 thereby assuring the best contact or engagement as between cooperating serrations 40 and 42 regardless of the degree to which lever member 22 has been rotated in its latching or closing direction.

As should be apparent, once the workpiece 66 is secured by arms 28 and 16, there is no chance that such workpiece will fall while being placed into the kiln, or while being heated in the kiln or even during its removal from the kiln.

Figure 8:
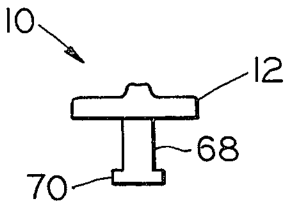
FIG. 8 illustrates, fragmentarily, a portion of the structure as shown in FIG. 2 with a modification thereof.

FIG. 8 fragmentarily illustrates that the pins or anchor means 46 and 48 of FIG. 1 may be modified to that as typically illustrated at 68 wherein the lower end is provided with an enlarged head-like portion 70 forming a generally inverted T-like configuration which could be slidably received as within the T-slots 58–60 of the support means or sagger tray 56 of FIG. 5.

Figure 9:
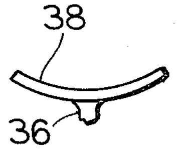
FIG. 9 illustrates, fragmentarily, an other portion of the structure as shown in FIG. 2 with another modification thereof.

FIG. 9 fragmentarily illustrates that the thumb or actuator plate 38 may actually be generally curved (as when viewed in a direction as in FIG. 2) thereby providing an enhanced engagement as with the operator's thumb or finger when the arm 36 is being resiliently urged as to cause disengagement of the latching or detent means.

Figure 11:
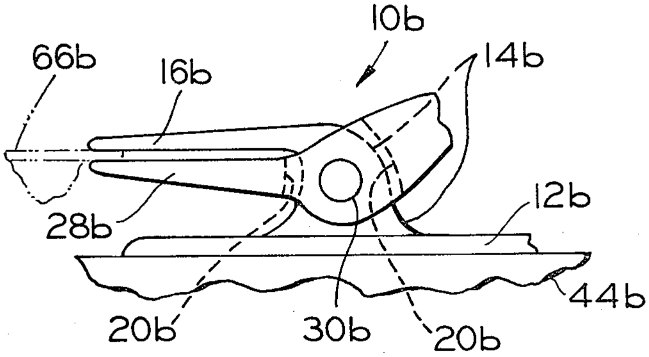
FIG. 11 is a fragmentary side elevational view of still another embodiment of the invention.
Figure 10:
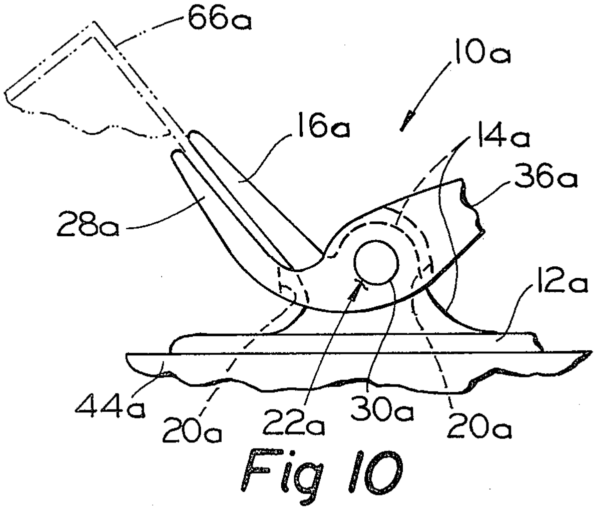
FIG. 10 is a fragmentary side elevational view of another embodiment of the invention.

FIGS. 10 and 11, respectively, fragmentarily illustrate other embodiments of the invention. Only so much of the structure of FIG. 1 is repeated, in each of FIGS. 10 and 11, as is believed necessary for a full understanding of such other embodiments. Those elements illustrated in FIG. 10 which are like or similar to those of FIG. 1 are identified with like reference members provided with a suffix "a". Those elements illustrated in FIG. 11 which are like or similar to those of FIG. 1 are identified with like reference numbers provided with a suffix "b". FIG. 10 depicts that the clamping or holding arms 16*a* and 28*a* may both be substantially inclined from the vertical, when the associated latching means is secured, in order to be able to hold a workpiece 66*a* of a configuration which requires a holding thereof other than vertically. Similarly, FIG. 11 depicts that the clamping or holding arms 16*b* and 28*b* may both be substantially horizontal when the associated latching means is secured, in order to be able to hold a workpiece 66*b* of a configuration which requires a holding thereof other than vertically or inclined, as in FIG. 10.

Figure 12:
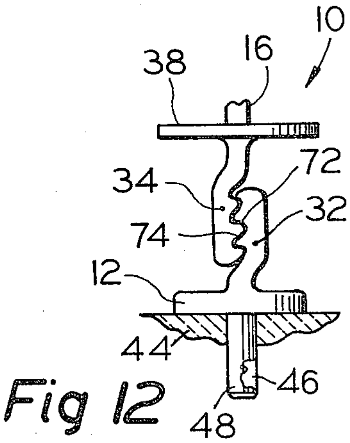
FIG. 12 is a view similar to a portion of that of FIG. 2 but illustrating a further modification.

FIG. 12, a view similar to that of FIG. 2, illustrates a further modification. That is, instead of the detent or latching serrations or teeth 40 and 42 of FIG. 2, the modification contemplates the provision of an undulating or convoluted surface 72 formed on detent or latching portion 34 and a coacting undulating or convoluted surface 74 formed on detent or latching portion 32. Preferably, such convolutions 72 and 74 would also be formed as radii of the axis of the pivot 30. Such a detent or latching means, as contemplated by FIG. 12, would provide, in the main, the same resistance to relative pivotal movement whether the lever member 22 was being moved (or tended to be moved) in either the clockwise or counter-clockwise direction.

It should be pointed out that the holding device of the invention is not limited to holding a workpiece as only between arms 28 and 16. That is, it is also possible that a workpiece could be positioned generally about arms 28 and 16 (as to thereby generally contain such arms 28 and 16) and the lever 22 then rotated in a counter-clockwise direction (as viewed in FIG. 1) thereby causing the arms 28 and 16 to effectively bear outwardly, in opposite directions, against the workpiece to hold it in a selected position. In such an arrangement, the convoluted latching or detent means of FIG. 12 might provide an improved action since the holding force in either direction could be generally the same.

Although only a preferred embodiment and a select number of modifications of the invention have been disclosed and described, it is apparent that other embodiments and modifications of the invention are possible within the scope of the appended claims.

What is claimed is:

1. A holding device for supporting a workpiece, comprising main body means, lever means, pivot connection means pivotally interconnecting said lever means to said main body means, a first fixed abutment member carried by said main body means, a second abutment member carried by said lever means, said second abutment member being movable toward and away from said first abutment member upon pivotal rotation of said lever means, said second abutment member being movable by said lever means as to cooperate with said first abutment member to hold and support said workpiece, and disengageable latching means carried by said main body means and said lever means for maintaining said second abutment member in a selected position relative to said first abutment member as to thereby assure the continued holding and support of said workpiece.

2. A holding device according to claim 1 and further comprising anchor means for detachably securing said main body means to associated base-like support structure.

3. A holding device according to claim 2 wherein said anchor means comprises at least one pin-like member slidably receivable within said support structure.

4. A holding device according to claim 3 wherein said pin-like member is integrally formed with said main body means.

5. A holding device according to claim 2 wherein said anchor means comprises pin-like means extending generally downwardly from said main body means for slidable reception within said support structure.

6. A holding device according to claim 5 wherein said pin-like means are integrally formed with said main body means.

7. A holding device according to claim 1 wherein said latching means comprises a first latching portion rigidly fixedly carried by said main body means, and a second latching portion rigidly fixedly carried by said lever means, and wherein said second latching portion is disengageable from said first latching portion by forcibly deflecting said lever means and said second latching portion carried thereby away from said first latching portion carried by said main body means.

8. A holding device according to claim 7 wherein said first latching portion comprises at least one first tooth-like serration, wherein said second latching portion comprises at least one second tooth-like serration, and wherein said first and second tooth-like serrations serve to latch said lever means to said main body means against rotation in at least one direction about the axis of said pivot connection means.

9. A holding device according to claim 8 wherein each of said first and second tooth-like serrations are formed as to be generally aligned with radii of the axis of said pivot connection means.

10. A holding device according to claim 7 wherein said first latching portion comprises a plurality of first tooth-like portions, wherein said second latching portion comprises a plurality of second tooth-like portions, and wherein said plurality of first and second tooth-like portions are effective to cooperate with each other to latch said lever means to said main body means against rotation in at least one direction about the axis of said pivot connection means.

11. A holding device according to claim 10 wherein each of said plurality of first tooth-like portions and each of said plurality of second tooth-like portions are formed as to be generally aligned with radii of the axis of said pivot connection means.

12. A holding device according to claim 7 wherein said first latching portion comprises a plurality of first convolutions, wherein said second latching portion comprises a plurality of second convolutions, and wherein said plurality of first convolutions are effective to cooperate with said plurality of second convolutions in order to latch said lever means to said main body means against relative rotation of said lever means about said pivot connection means.

13. A holding device according to claim 12 wherein each of said plurality of first convolutions and each of said plurality of second convolutions are formed as to be generally aligned with radii of the axis of said pivot connection means.

14. A holding device according to claim 1 wherein said lever means comprises cavity means formed therein, wherein a portion of said main body means extends into said cavity means, wherein said pivot connection means pivotally maintains said portion of said main body means within said cavity means, and wherein said first abutment member extends through said cavity means.

15. A holding device according to claim 14 wherein said cavity means defines first and second lever portions spaced from each other, wherein said first and second lever portions are respectively situated at opposite sides of said portion of said main body means extending into said cavity means.

16. A holding device according to claim 7 wherein said lever means comprises an actuator plate effective to be manually engaged for latching and unlatching said latching means, said actuator plate being contoured as to form a trough-like portion effective for generally cradling a finger of a person operating said holding device, said trough-like portion serving to reduce the tendency of said person's finger sliding off of said actuator plate when forcibly deflecting said lever means to achieve disengagement between said first and second latching portions.

17. A holding device according to claim 1 wherein said main body means comprises a lower disposed mounting surface, and pin-like anchor means extending downwardly from said mounting surface, and wherein said mounting surface is substantially wider than the width of said pin-like anchor means measured in the same direction.

18. The combination of a sagger tray and a holding device for supporting a workpiece, said sagger tray comprising a mounting surface and a plurality of openings formed in said mounting surface, said holding device comprising main body means supported on said mounting surface and detachably fixed to at least certain of said openings, lever means, pivot connection means pivotally interconnecting said lever means to said main body means, a first fixed abutment member carried by said main body means, a second abutment member carried by said lever means, said second abutment member being movable toward and away from said first abutment member upon pivotal rotation of said lever means, said second abutment member being movable by said lever means as to cooperate with said first abutment member to hold and support said workpiece, and disengageable latching means carried by said main body means and said lever means for maintaining said second abutment member in a selected position relative to said first abutment member as to thereby assure the continued holding and support of said workpiece.

* * * * *